United States Patent
Hillis et al.

(10) Patent No.: US 7,590,635 B2
(45) Date of Patent: Sep. 15, 2009

(54) DISTRIBUTED DATA STORE WITH AN ORDERSTAMP TO ENSURE PROGRESS

(75) Inventors: W. Daniel Hillis, Encino, CA (US); Eric Bax, Altadena, CA (US); Mathias L. Kolehmainen, Los Angeles, CA (US)

(73) Assignee: Applied Minds, Inc., Glendale, CA (US)

( * ) Notice: Subject to any disclaimer, the term of this patent is extended or adjusted under 35 U.S.C. 154(b) by 283 days.

(21) Appl. No.: 11/300,950

(22) Filed: Dec. 14, 2005

(65) Prior Publication Data

US 2007/0011159 A1    Jan. 11, 2007

Related U.S. Application Data

(60) Provisional application No. 60/636,822, filed on Dec. 15, 2004.

(51) Int. Cl.
*G06F 7/00* (2006.01)
*G06F 17/30* (2006.01)

(52) U.S. Cl. .............................. 707/10; 707/4
(58) Field of Classification Search ............... 707/1–10, 707/100–104.1, 200–206
See application file for complete search history.

(56) References Cited

U.S. PATENT DOCUMENTS

| | | | |
|---|---|---|---|
| 4,933,936 A | 6/1990 | Rasmussen et al. | |
| 5,454,101 A | 9/1995 | Mackay et al. | |
| 5,694,593 A * | 12/1997 | Baclawski | 707/5 |
| 5,799,322 A | 8/1998 | Mosher, Jr. | |
| 5,924,090 A | 7/1999 | Krellenstein | |
| 6,016,489 A | 1/2000 | Cavanaugh et al. | |
| 6,026,413 A | 2/2000 | Challenger et al. | |
| 6,442,565 B1 | 8/2002 | Tyra et al. | |
| 6,484,161 B1 | 11/2002 | Chipalkatti et al. | |
| 6,578,131 B1 | 6/2003 | Larson et al. | |
| 6,904,454 B2 | 6/2005 | Stickler | |
| 7,047,242 B1 | 5/2006 | Ponte | |
| 7,152,165 B1 | 12/2006 | Maheshwari et al. | |
| 7,281,024 B1 | 10/2007 | Banerjee et al. | |
| 7,313,581 B1 | 12/2007 | Bachmann et al. | |
| 2002/0036617 A1 | 3/2002 | Pryor | |
| 2003/0023609 A1 | 1/2003 | Della-Libera et al. | |
| 2003/0163597 A1 | 8/2003 | Hellman et al. | |
| 2005/0060647 A1 | 3/2005 | Doan et al. | |

(Continued)

OTHER PUBLICATIONS

Cesa-Bianchi et al., Minimizing regret with label efficient prediction, Jun. 6, 2005, IEEE, vol. 51, 2152-2162.*

(Continued)

*Primary Examiner*—Jean B Fleurantin
(74) *Attorney, Agent, or Firm*—Michael A. Glenn; Glenn Patent Group

(57) ABSTRACT

A distributed data store labels operations with globally unique identifiers that contain approximate timestamps. The labels are used to address causes of inconsistency in the distributed data store while ensuring progress. A first mode is provided that stores the latest label for each entry is useful if re-inserts and deletes are rare. Another mode is provided that stores a history of labels for each entry can be used if there are many re-inserts and deletes. A further mode is provided that stores a history of labels for queries can report updates to query answers as inserts and deletes settle across the distributed data store.

12 Claims, 9 Drawing Sheets

U.S. PATENT DOCUMENTS

2005/0193024 A1 9/2005 Beyer et al.
2006/0022955 A1 2/2006 Kennedy

OTHER PUBLICATIONS

Maggie Duong et al., LSDX: a new labelling scheme for dynamically updating XML data, Jan. 2005, ACM, 185-193.*

Crespo, et al; *Semantic Overlay Networks for P2P Systems*; Jan. 2003, Technical Report, Stanford University, pp. 16.

Larson; *Dynamic Hash Tables*; Apr. 1998; Communications of the ACM, vol. 31, No. 4, pp. 446-457.

R. Huebsch, J. Hellerstein, N. Lanham, B. Loo, S. Shenker, and I. Stoica; Querying the Internet with PIER; Proceedings of the 29th VLDB Conference, Berlin, Germany, 2003, 12 pages.

M. Stonebraker, P. Aoki, W. Litwin, A. Pferffer, A. Sah, J. Sidell, C. Sttttaelin, and A. Yu; Mariposa: A Wide-Area Distributed Database System; Department of Electrical Engineering & Computer Sciences, Univ. of Calif Berkeley, CA,; the VLDB Journal 1996, 17 pages.

Jeff Dean; Google's Big Table; University of Washington Oct. 18, 2005; Google Blogoscoped 2003-2005 by Philipp Lenssen, 4 pages.

http://en.wikipedia.org/wiki/Content_addressable_network; Content Addressable Network; May 2005, 4 pages.

S. Ratnasamy, P. Francis, M. Handley, R. Karp, and S. Shenker; A Scalable Content-Addressable Network. Proc. ACM SIGCOMM 2001, pp. 161-172, Aug. 2001.

Adam Bosworth; IT Conversations New Ideas Through Your Headphones; Santa Clara, CA Apr. 18-25, 2005, 5 pages.

D. Reed, Naming and Synchronization in a Decentralized Computer System, MIT/LCS/TR-205, MIT (1978), 188 pages.

Serge Abiteboul et al; "Compact Labeling Schemes for Ancestors Queries"; Jan. 2001 Symposium on Discrete Algorithms; ISBN 0-89871-4907; pp. 547-556, specifically 554.

* cited by examiner

DISTRIBUTED DATA STORE WITH AN ORDERSTAMP TO ENSURE PROGRESS

CROSS REFERENCE TO RELATED APPLICATIONS

This application claims priority to U.S. provisional patent application serial no. US_60/636,822, filed Dec. 15, 2004, which application is incorporated herein in its entirety by this reference thereto.

BACKGROUND OF THE INVENTION

1. Technical Field

The invention relates to distributed data stores. More particularly, the invention relates to a distributed data store with an orderstamp to ensure progress.

2. Description of the Prior Art

Overview

A data store offers insert, delete, and query operations on a set of data items called a collection. Each data item in the collection is called an entry. The set of all possible entries is called the universal set. Insert operations add entries to the collection. Delete operations remove entries from the collection. A query operation specifies a subset of the universal set, and the data store indicates which elements of that subset are entries within the collection. A query is said to cover an entry if the subset specified by the query contains the entry. A distributed data store is a data store implemented using multiple computers and communication links among the computers.

A distributed data store may provide redundancy, meaning that multiple computers may record the same entry. Redundancy can ensure high availability, meaning that the distributed data store can respond quickly to queries from different locations and can respond to many queries at once. Redundancy can also ensure failover, meaning that even when some computers fail, the distributed data store can continue to respond to queries accurately.

Each computer in a distributed data store covers some subset of the universal set, meaning that each computer records any entries in that subset. In a distributed data store providing redundancy, an entry may be covered by multiple computers. Thus, inserted entries are propagated to multiple computers. The times to propagate to different computers may differ, causing an insert to be recorded at some computers before others. Delete operations also propagate to multiple computers. Thus, an entry may be deleted from some computers before others.

Concerns

Inconsistency Due to Settling

Differences in propagation times for inserts and deletes can cause inserts and deletes to arrive at different computers in different orders. While an insert has arrived at some but not all of the computers to be affected by the insert, a query that covers the entry yields a different result depending on which computer the data store uses to answer the query. The same is true while a delete has arrived at some but not all of the computers to be affected by the delete. This is referred to as inconsistency due to settling.

Inconsistency Due to Order of Operations

Differences in propagation times can also cause inconsistencies that remain, even after a set of operations completes. This is referred to as continuing inconsistency. For example, an insert operation for an entry may begin, followed by the start of a delete operation for that entry, followed by the start of another insert operation for the same entry. As a result, one computer may receive these operations in the order they started, i.e. inserting the entry, deleting it, and inserting it again. Another computer may receive the operations in a different order, i.e. inserting the entry, inserting the entry again, and deleting the entry. If the data store treats multiple inserts of a common entry as a single insert of the entry then, after these operations, the second computer records that the entry is not in the collection. The first computer, on the other hand, records that the entry is in the collection. A query that covers the entry gets a different result, depending on which computer the data store uses to answer the query.

Inconsistency Due to Duplicate Operations

Within a distributed data store, the same insert or delete operation may arrive at a computer multiple times due to communication errors, changes in communication routes, or redundant routes. Also, propagation delays can cause these duplicates of operations to arrive in different orders at different computers. Thus, computers processing duplicates of operations can create continuing inconsistency.

Inconsistency Due to Synchronization

Failure of computers can lead to failure of some insert or delete operations to arrive at some computers. When functionality is restored after a computer failure, the computer may synchronize with other computers that cover the overlapping portions of the universal set to avoid inconsistencies caused by inserts and deletes that occur while the computer is not operating. This synchronization at recovery time, combined with propagation delays, can cause a type of continuing inconsistency referred to as inconsistency due to synchronization. For example, suppose computer A receives an insert of an entry, then a delete of that entry, and then the computer fails. Meanwhile, computer B receives the insert of the entry. While the delete of the entry is still in transit to computer B, computer A restarts and synchronizes with computer B, receiving the information that the entry is in the collection. After the synchronization, the delete arrives at computer B. Now computer A records that the entry is in the collection, and computer B records that the entry is not in the collection.

Query Ceiling

The data store may take a long time to answer a query, especially if the subset specified by the query includes many entries in the data store. While the query is being answered, inserts and deletes may occur on entries covered by the query. This can lead to undesirable query answers in some cases. For example, suppose there is a query on a database of entries corresponding to people, and the purpose is to determine the relative frequencies of different last names. Suppose the data store handles the query in alphabetical order of last names. Suppose the data store is ingesting many new entries as the query progresses. Then the query results are inaccurate because the relative frequencies of last names early in alphabetical ordering are underestimated and the relative frequencies of last names late in alphabetical ordering are overestimated. Avoiding this kind of problem is called imposing a query ceiling.

Prior Art

Mutual Exclusion

One well-known way to avoid inconsistency due to settling is to impose mutual exclusion, allowing either only queries or only inserts and deletes to be in progress at any time by delaying the start of any query operation until all insert and delete operations in progress reach all affected computers, and by delaying the start of any insert and delete operations until all query operations in progress have completed. This form of mutual exclusion imposes a query ceiling by explicitly avoiding inserts and deletes during a query. Similarly, one way to avoid inconsistency due to order of operations is to impose mutual exclusion between inserts and deletes, never allowing both inserts and deletes to be in progress at once. A shortcoming of mutual exclusion is that it causes delays in the distributed system, thus slowing performance.

Counting Inserts and Deletes for Each Entry

Another way to avoid inconsistency due to order of operations is to count for each entry how many inserts and deletes have been received. An entry is in the collection only if the number of inserts is greater than the number of deletes. A shortcoming is that this scheme suffers errors if a computer receives and processes duplicates of insert and delete operations. Also, the desired semantics are often such that multiple inserts followed by a single delete should remove an entry from the collection. Counting does not support such semantics.

Unique Serial Identifiers

One way to avoid duplicates of insert and delete operations is to issue a unique identifier to each operation. Each computer maintains a list of identifiers of operations processed. If an operation with an identifier in the list arrives, the computer ignores the operation. If the unique identifier is serial, that is, if it increases with each operation, then it can be used to impose a partial query ceiling, as follows:

Label each entry recorded in each computer with the greatest unique serial identifier of any insert operation on the entry.

For queries with unique serial identifiers before that of the label on the entry, ignore the entry.

This prevents an insert after a query starts from being included in the answer to the query. However, this does not prevent a delete after a query starts from affecting the answer to the query. It also introduces a potential error, as follows. Suppose that an entry is in the collection, a query starts, and then the entry is re-inserted. When the query is processed on the entry the query ignores the entry because the entry label is after the query identifier. Another potential shortcoming of unique serial identifiers is that they may be issued from a single site to ensure they are unique and serial, which causes a bottleneck because each operation must access the single site before proceeding.

Timestamps

The data store may label each operation with a timestamp, indicating the time at which the operation began. Timestamps are non-unique serial identifiers. They can be issued locally, avoiding the problem of all operations having to access a single site. However, they introduce the issue of ties, in which multiple operations begin at the same time according to the computers that issue the timestamps.

Orderstamps

The data store may label each operation with an approximate timestamp that is also a unique serial identifier. Such a label is referred to as an orderstamp. One way to create an orderstamp is to encode the time at which an operation begins in the high-order bits of a label and encode a unique identifier corresponding to the computer at which the operation begins in the low-order bits. The same time zone should be used to produce the time on all computers in the system. Then orderstamps can be compared to determine, up to the accuracy of clock skew among processors, the order in which operations began.

Pseudo-Time

D. Reed, *Naming and Synchronization in a Decentralized Computer System*, MIT/LCS/TR-205, MIT (1978) refers to orderstamps as pseudo-time. The thesis teaches methods to use pseudo-time to maintain consistency in a distributed data store. Those methods are very conservative, aborting operations that might interfere with each other. A drawback of those methods is the possibility of what the thesis calls dynamic thrashing, in which operations may be delayed indefinitely by having other operations cause aborts each time the operations are retried.

SUMMARY OF THE INVENTION

The invention is a collection of modes of operation for a distributed data store. Each mode uses orderstamps, which are globally unique labels containing approximate timestamps, to address causes of inconsistency. One mode stores the latest orderstamp of any insert or delete for each entry. Another mode stores a history of inserts and deletes for each entry. Yet another mode stores a history of queries in addition to a history for each entry. A distributed data store may implement one or more of these modes of operation. The processes in each mode ensure progress; the data store never rejects an operation. As a result, there is no possibility of dynamic thrashing.

DETAILED DESCRIPTION OF THE INVENTION

The invention comprises a set of modes of operation for a distributed data store. Each mode addresses the following concerns: inconsistency due to duplicate operations, inconsistency due to order of operations, inconsistency due to synchronization, query ceilings, and inconsistency due to settling.

In the order presented below, each mode requires progressively more computation and resources but adds progressively more capabilities to address the above concerns. The description of each mode indicates the data structures and processes introduced by the mode and how the mode addresses the concerns. After the descriptions of modes, there is a description of methods to reclaim storage used by some of the modes.

Mode: Maintain Greatest Insert or Delete Orderstamp for Each Entry

Figure 1:
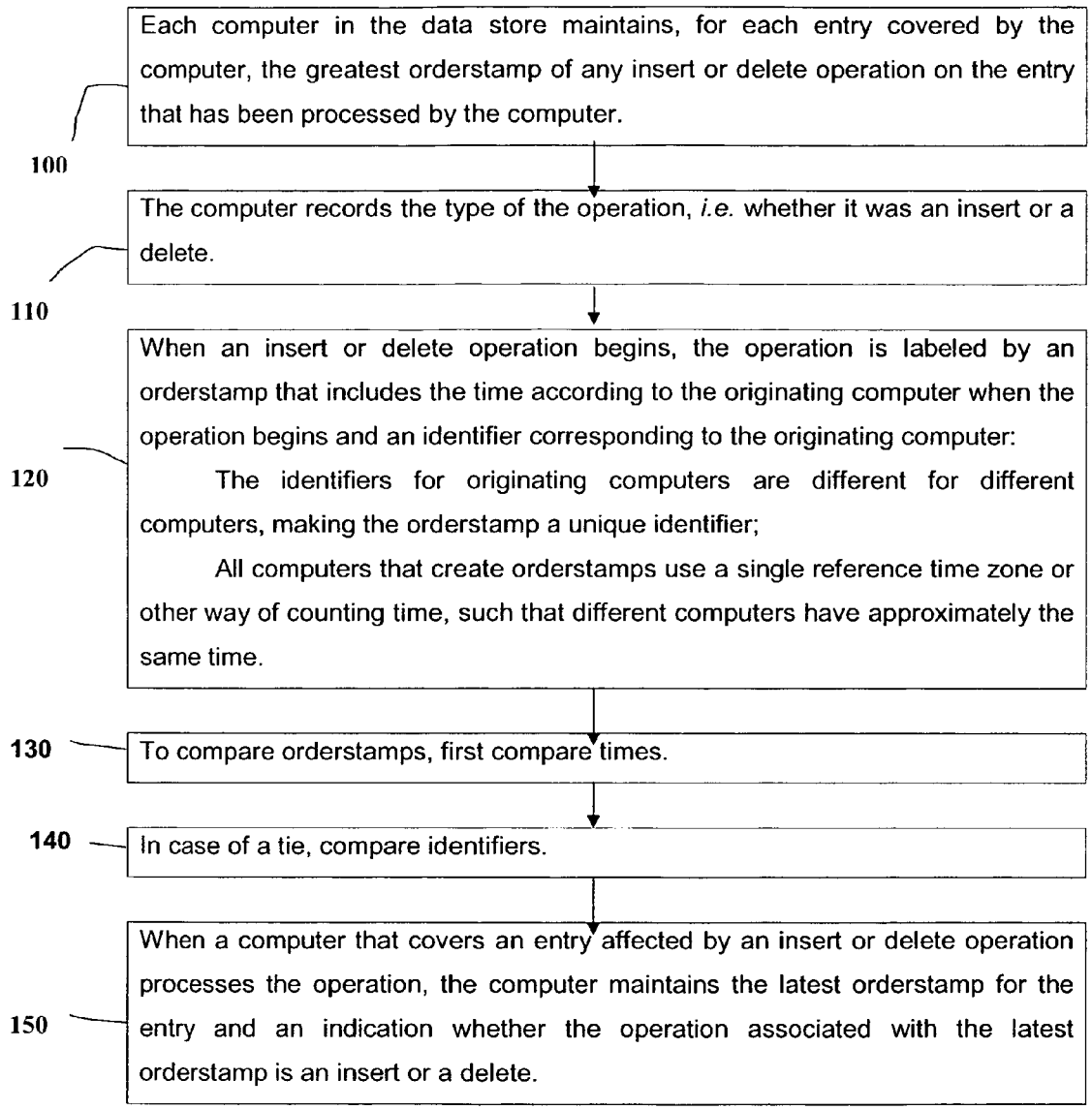
FIG. 1 is a first flow diagram of a mode for maintaining greatest insert or delete orderstamp for each entry according to the invention.

In this mode (see FIG. 1), each computer in the data store maintains, for each entry covered by the computer, the greatest orderstamp of any insert or delete operation on the entry that has been processed by the computer (100). The computer also records the type of the operation, i.e. whether it was an insert or a delete (110).

This mode includes the processes:

When an insert or delete operation begins, the operation is labeled by an orderstamp that includes the time according to the originating computer when the operation begins and an identifier corresponding to the originating computer. The identifiers for originating computers are different for different computers, making the orderstamp a unique identifier. All computers that create orderstamps use a single reference time zone or other way of counting time, such that different computers have approximately the same time (120).

To compare orderstamps, first compare times (130).

In case of a tie, compare identifiers (140). As a result, orderstamps are approximate timestamps. Because orderstamps are ordered approximately in time, we refer to greater, greatest, lesser, and least orderstamps as later, latest, earlier, and earliest orderstamps, respectively.

When a computer that covers an entry affected by an insert or delete operation processes the operation, the computer maintains the latest orderstamp for the entry and an indication whether the operation associated with the latest orderstamp is an insert or a delete (150).

This mode addresses inconsistency due to duplicate operations, due to different orders of operations, and due to synchronization. This mode offers partial or conditional solutions to the concerns of query ceilings and inconsistency due to settling.

Figure 2:
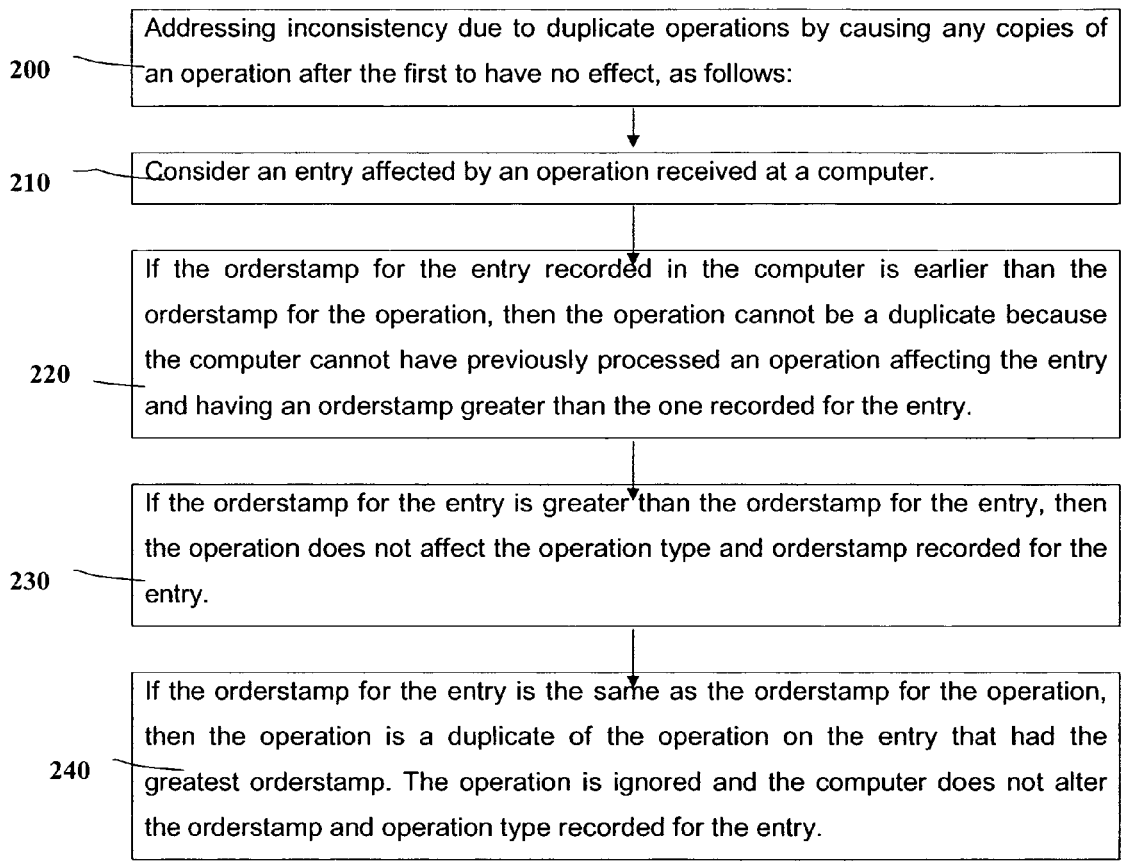
FIG. 2 is a second flow diagram of a mode for maintaining greatest insert or delete orderstamp for each entry according to the invention.

This mode (see FIG. 2) also addresses inconsistency due to duplicate operations by causing any copies of an operation after the first to have no effect (200), as follows:

Consider an entry affected by an operation received at a computer (210).

If the orderstamp for the entry recorded in the computer is earlier than the orderstamp for the operation, then the operation cannot be a duplicate because the computer cannot have previously processed an operation affecting the entry and having an orderstamp greater than the one recorded for the entry (220).

If the orderstamp for the entry is greater than the orderstamp for the entry, then the operation does not affect the operation type and orderstamp recorded for the entry (230).

If the orderstamp for the entry is the same as the orderstamp for the operation, then the operation is a duplicate of the operation on the entry that had the greatest orderstamp. The operation is ignored and the computer does not alter the orderstamp and operation type recorded for the entry (240).

This mode also addresses inconsistency due to different orders of operations by ensuring that all computers that cover an entry have the same record of orderstamp and operation type for the entry, once all operations that affect the entry reach all the computers that cover the entry. All the computers that cover the entry settle to recording for the entry the latest orderstamp over operations that affect the entry, and the type of the operation is that of the operation with the latest orderstamp.

Figure 3:
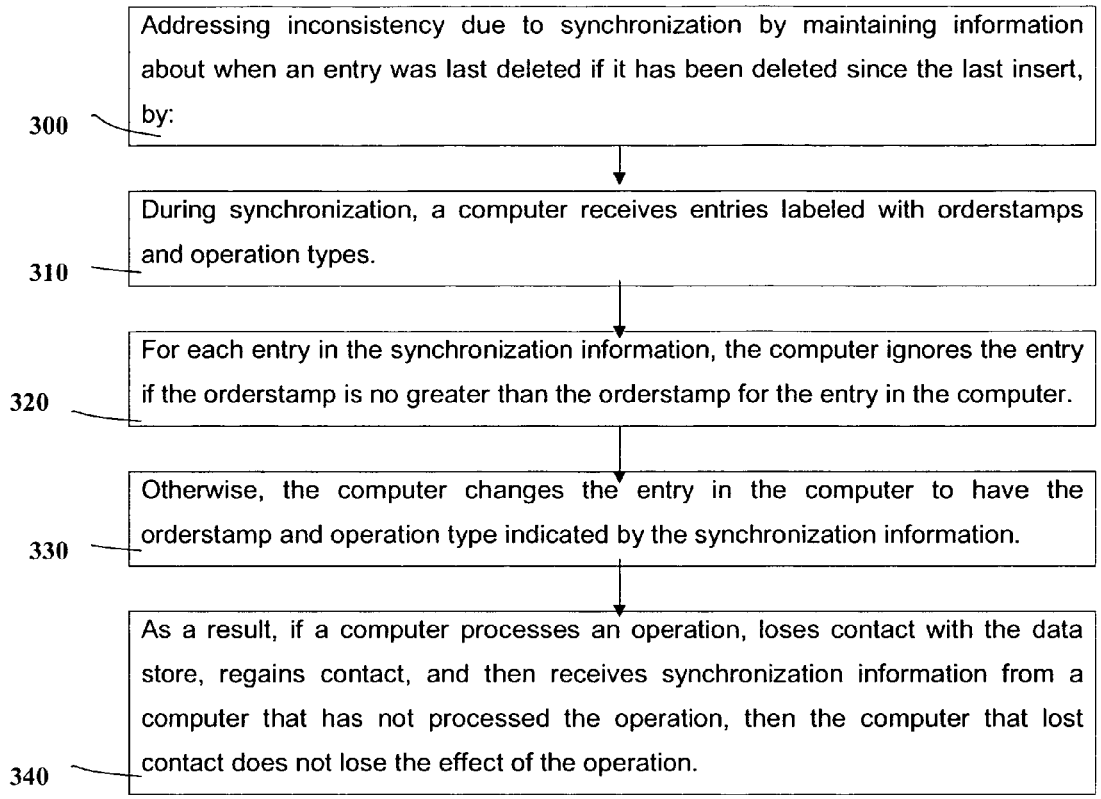
FIG. 3 is a third flow diagram of a mode for maintaining greatest insert or delete orderstamp for each entry according to the invention.

This mode (see FIG. 3) also addresses inconsistency due to synchronization by maintaining information about when an entry was last deleted if it has been deleted since the last insert (300):

During synchronization, a computer receives entries labeled with orderstamps and operation types (310).

For each entry in the synchronization information, the computer ignores the entry if the orderstamp is no greater than the orderstamp for the entry in the computer (320).

Otherwise, the computer changes the entry in the computer to have the orderstamp and operation type indicated by the synchronization information (330).

As a result, if a computer processes an operation, loses contact with the data store, regains contact, and then receives synchronization information from a computer that has not processed the operation, then the computer that lost contact does not lose the effect of the operation (340).

Figure 4:
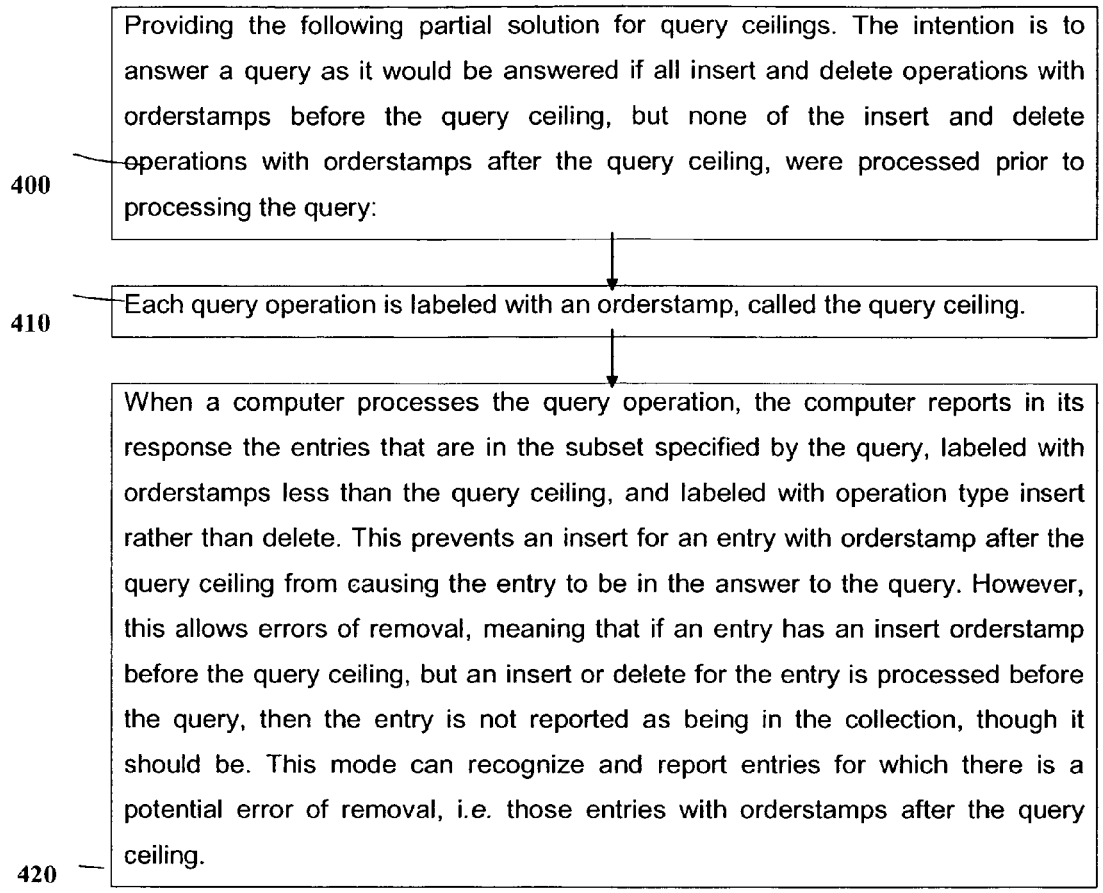
FIG. 4 is a fourth flow diagram of a mode for maintaining greatest insert or delete orderstamp for each entry according to the invention.

This mode (see FIG. 4) also offers the following partial solution for query ceilings. The intention is to answer a query as it would be answered if all insert and delete operations with orderstamps before the query ceiling, but none of the insert and delete operations with orderstamps after the query ceiling, were processed prior to processing the query (400):

Each query operation is labeled with an orderstamp, called the query ceiling (410).

When a computer processes the query operation, the computer reports in its response the entries that are in the subset specified by the query, labeled with orderstamps less than the query ceiling, and labeled with operation type insert rather than delete. This prevents an insert for an entry with orderstamp after the query ceiling from causing the entry to be in the answer to the query. However, this allows errors of removal, meaning that if an entry has an insert orderstamp before the query ceiling, but an insert or delete for the entry is processed before the query, then the entry is not reported as being in the collection, though it should be. This mode can recognize and report entries for which there is a potential error of removal, i.e. those entries with orderstamps after the query ceiling (420).

Figure 5:
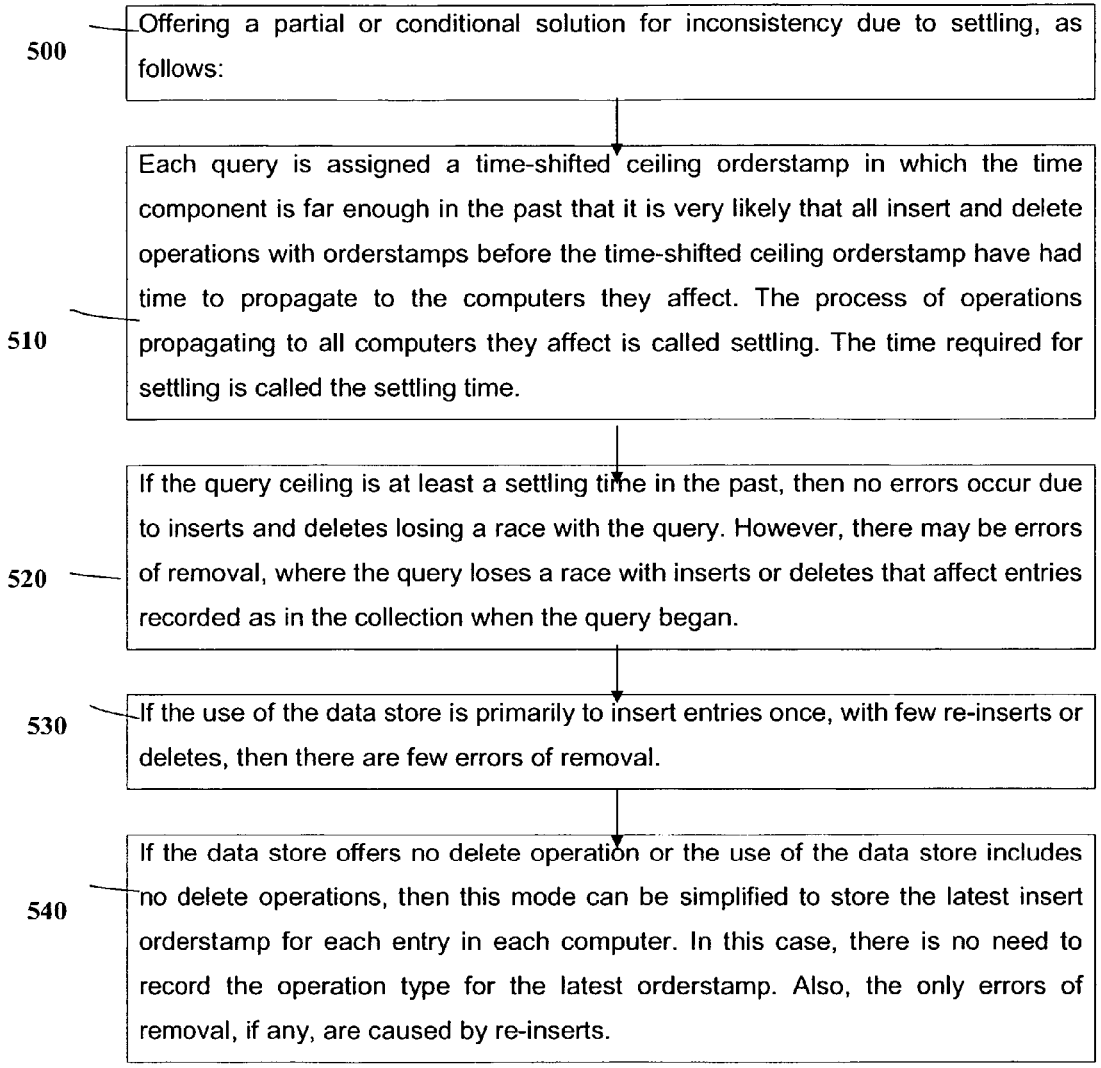
FIG. 5 is a fifth flow diagram of a mode for maintaining greatest insert or delete orderstamp for each entry according to the invention.

This mode (see FIG. 5) also offers a partial or conditional solution for inconsistency due to settling (500):

Each query is assigned a time-shifted ceiling orderstamp in which the time component is far enough in the past that it is very likely that all insert and delete operations with orderstamps before the time-shifted ceiling orderstamp have had time to propagate to the computers they affect. The process of operations propagating to all computers they affect is called settling. The time required for settling is called the settling time (510).

If the query ceiling is at least a settling time in the past, then no errors occur due to inserts and deletes losing a race with the query. However, there may be errors of removal, where the query loses a race with inserts or deletes that affect entries recorded as in the collection when the query began (520).

If the use of the data store is primarily to insert entries once, with few re-inserts or deletes, then there are few errors of removal (530).

If the data store offers no delete operation or the use of the data store includes no delete operations, then this mode can be simplified to store the latest insert orderstamp for each entry in each computer. In this case, there is no need to record the operation type for the latest orderstamp. Also, the only errors of removal, if any, are caused by re-inserts (540).

Mode: Maintain Insert and Delete History for Each Entry

Figure 6:
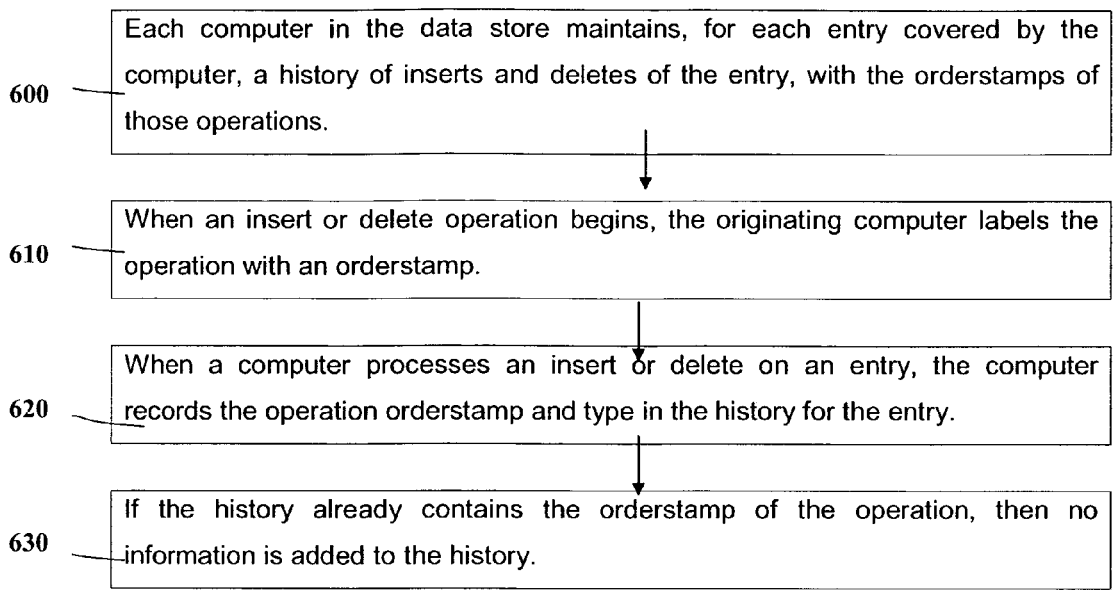
FIG. 6 is a first flow diagram of a mode for maintaining insert and delete history for each entry according to the invention.

In this mode (see FIG. 6), each computer in the data store maintains, for each entry covered by the computer, a history of inserts and deletes of the entry, with the orderstamps of those operations (600). As in the previous mode, when an insert or delete operation begins, the originating computer labels the operation with an orderstamp (610). However, in this mode, when a computer processes an insert or delete on an entry, the computer records the operation orderstamp and type in the history for the entry (620). If the history already contains the orderstamp of the operation, then no information is added to the history (630).

This mode also addresses the concerns of inconsistency due to order of operations, inconsistency due to duplicate operations, and inconsistency due to synchronization in the same manner as the previous mode because the latest orderstamp and operation type for each entry is a subset of the history for the entry.

Figure 7:
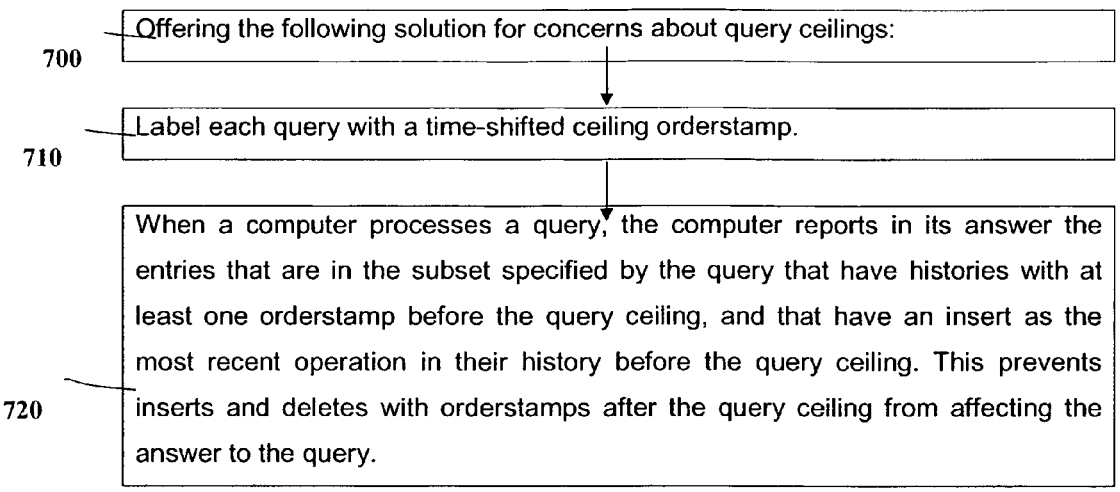
FIG. 7 is a second flow diagram of a mode for maintaining insert and delete history for each entry according to the invention.

This (see FIG. 7) also mode offers the following solution for concerns about query ceilings (700):

As before, label each query with a time-shifted ceiling orderstamp (710).

When a computer processes a query, the computer reports in its answer the entries that are in the subset specified by the query that have histories with at least one orderstamp before the query ceiling, and that have an insert as the most recent operation in their history before the query ceiling. This prevents inserts and deletes with orderstamps after the query ceiling from affecting the answer to the query (720). In other words, this prevents errors of removal. As a result, this mode is appropriate even if the use of the data store includes many re-inserts and deletes. The choice of query ceiling in this mode mediates a tradeoff between attempting to ensure consistency by setting the ceiling earlier and ensuring that the answer is current by setting the ceiling later.

Mode: Maintain Insert, Delete, and Query Histories

Figure 8:
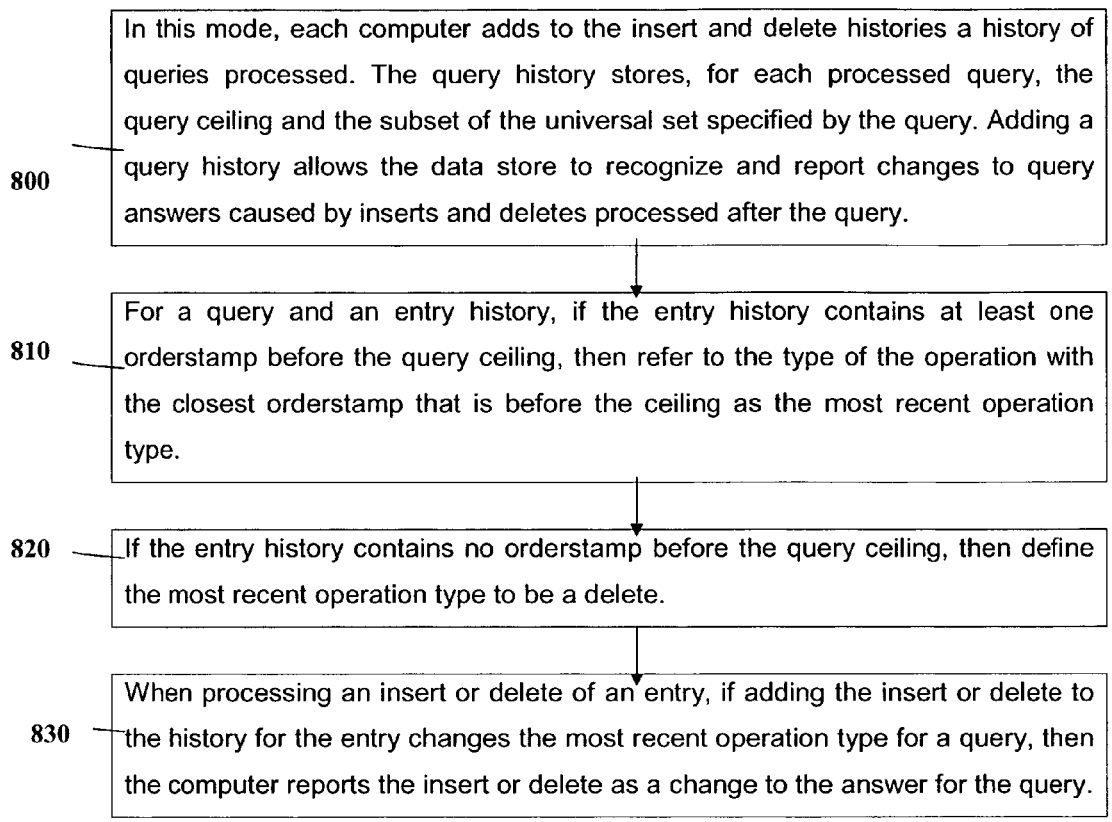
FIG. 8 is a flow diagram of a mode for maintaining insert, delete, and query histories according to the invention.

In this mode (see FIG. 8), each computer adds to the insert and delete histories a history of queries processed. The query history stores, for each processed query, the query ceiling and the subset of the universal set specified by the query. Adding a query history allows the data store to recognize and report changes to query answers caused by inserts and deletes processed after the query (800).

For a query and an entry history, if the entry history contains at least one orderstamp before the query ceiling, then refer to the type of the operation with the closest orderstamp that is before the ceiling as the most recent operation type (810).

If the entry history contains no orderstamp before the query ceiling, then define the most recent operation type to be a delete (820).

When processing an insert or delete of an entry, if adding the insert or delete to the history for the entry changes the most recent operation type for a query, then the computer reports the insert or delete as a change to the answer for the query (830).

Also in this mode, query answers can be updated as inserts and deletes settle. A query ceiling may be chosen with a time in the past to reduce the likelihood or amount of updates. Alternatively, a query ceiling may be chosen in the future to receive a stream of updates. A query ceiling may even be chosen with time beyond the lifetime of the data store, in order to continue to receive updates as long as the data store operates.

The data store may allow users to specify for each query the types of updates to answers to report. Options include receiving only updates based on inserts, only updates based on deletes, both, or neither. If no updates are requested for a query, then the data store need not record information about the query in query histories.

Garbage Collection

For some applications of the data store, it is useful to store histories of operations for the entire lifetime of the data store. For other applications, it is useful to reclaim the storage used for histories during the lifetime of the data store. The following are some strategies to reclaim storage, a process commonly referred to as garbage collection.

Figure 9:
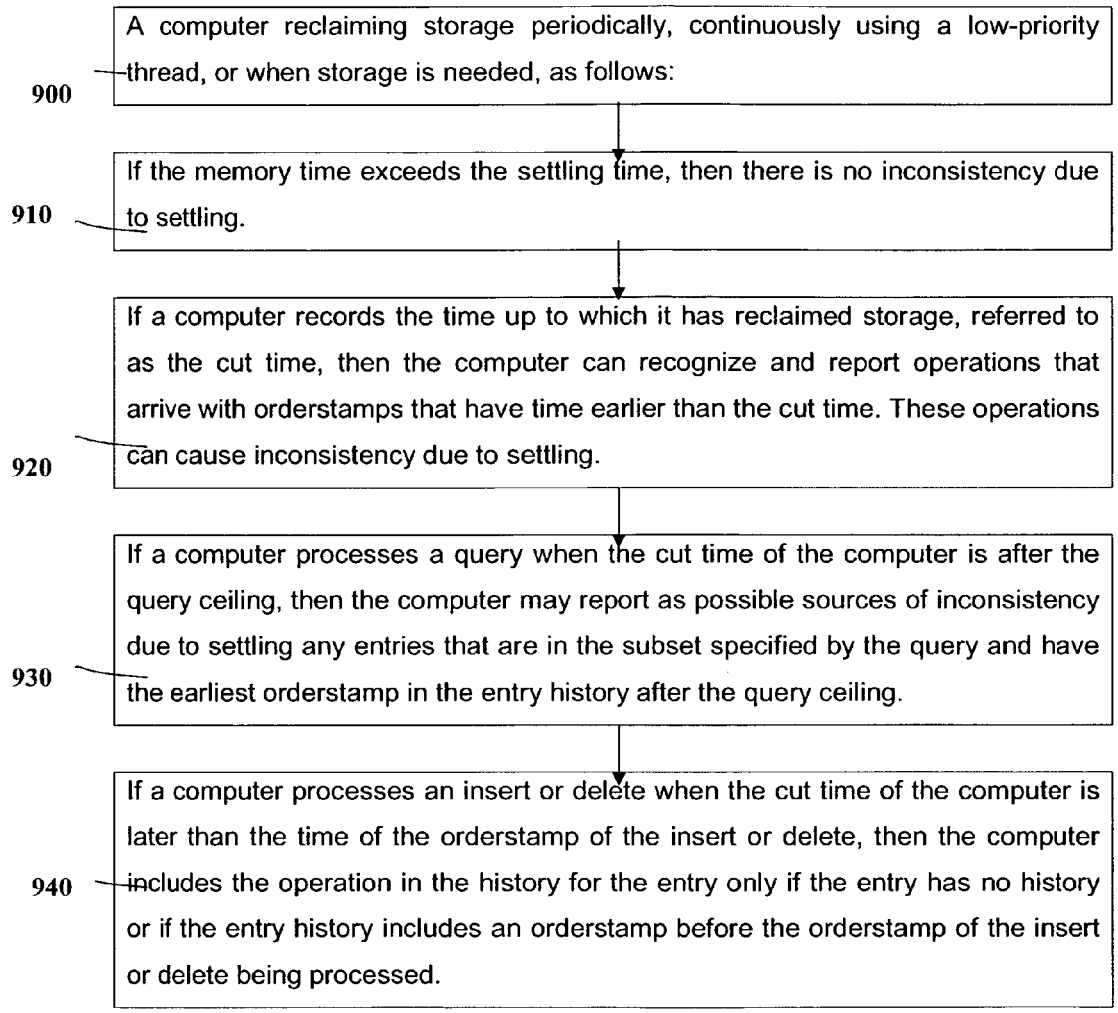
FIG. 9 is a flow diagram of a method for reclaiming storage by a computer.

A simple strategy is to have a time period for the data store, referred to as a memory time, and allow each computer to reclaim storage used to record the history of queries with orderstamps at least a memory time in the past. Also, allow each computer to reclaim storage used to record inserts and deletes that have orderstamps that are at least a memory time in the past and that are not the most recent orderstamps in the histories of their entries. As shown in FIG. 9, a computer may reclaim storage periodically, continuously using a low-priority thread, or when storage is needed (900).

If the memory time exceeds the settling time, then there is no inconsistency due to settling (910).

If a computer records the time up to which it has reclaimed storage, referred to as the cut time, then the computer can recognize and report operations that arrive with orderstamps that have time earlier than the cut time. These operations can cause inconsistency due to settling (920).

If a computer processes a query when the cut time of the computer is after the query ceiling, then the computer may report as possible sources of inconsistency due to settling any entries that are in the subset specified by the query and have the earliest orderstamp in the entry history after the query ceiling (930).

If a computer processes an insert or delete when the cut time of the computer is later than the time of the orderstamp of the insert or delete, then the computer includes the operation in the history for the entry only if the entry has no history or if the entry history includes an orderstamp before the orderstamp of the insert or delete being processed (940).

An alternative to setting a single memory time for the data store is to allow computers in the data store to set their own memory times. Also, memory times may be adjusted based on the need for storage. This allows the data store to deliver the best history allowed by resources available under the workload over time.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for addressing inconsistency and ensuring progress in a distributed data store involving one or more computers, comprising the steps of:

labeling an entry with an orderstamp, wherein said orderstamp comprises an approximate timestamp comprising a serial identifier, wherein the approximate timestamp comprises an approximate time that the entry originated on an originating computer, and wherein the serial identifier comprises an identifier unique to the originating computer such that each orderstamp is globally unique;
recording in a storage for each entry in a computer the latest orderstamp among orderstamps for insert and delete operations for that entry that have been processed by the computer;
recording for each entry in the computer whether an operation corresponding to the latest orderstamp is an insert or a delete;
labeling a query with an orderstamp; and
when processing a query on the computer, identifying entries that are in a subset specified by the query, that are covered by the computer, that have latest orderstamp before the orderstamp of the query, and that have operation type insert corresponding to the latest orderstamp.

2. A method for addressing inconsistency and ensuring progress in a distributed data store involving one or more computers, comprising the steps of:
labeling an insert with an orderstamp, said orderstamp in turn comprising an approximate timestamp that includes a serial identifier, wherein the approximate timestamp comprises an approximate time that the insert originated on an originating computer, and wherein the serial identifier comprises an identifier unique to the originating computer such that each orderstamp is globally unique;
labeling a delete with an orderstamp, said orderstamp in turn comprising an approximate timestamp that includes a serial identifier, wherein the approximate timestamp comprises an approximate time that the delete originated on an originating computer, and wherein the serial identifier comprises an identifier unique to the originating computer such that each orderstamp is globally unique;
recording for each entry in a computer a latest orderstamp and among orderstamps for insert and delete operations for that entry that have been processed by the computer;
recording for each entry in the computer whether an operation corresponding to the latest orderstamp is an insert or a delete;
labeling a query with an orderstamp; and
when processing a query on a computer, identifying entries that are in a subset specified by the query, that are covered by the computer, that have latest orderstamp before the orderstamp of the query, and that have operation type insert corresponding to the latest orderstamp.

3. The method of claim 2, further comprising the steps of:
when processing a query on a computer, identifying whether there is at least one entry that is in a subset specified by the query, that is covered by the computer, and that has latest orderstamp after the orderstamp of the query; and
if there is such an entry, indicating that the query answer may have been affected by a re-insert or a delete.

4. A method for addressing inconsistency and ensuring progress in a distributed data store involving one or more computers, comprising the steps of:
labeling an insert with an orderstamp, said orderstamp in turn comprising an approximate timestamp that includes a serial identifier, wherein the approximate timestamp comprises an approximate time that the insert originated on an originating computer, and wherein the serial identifier comprises an identifier unique to the originating computer such that each orderstamp is globally unique;
labeling a delete with an orderstamp, said orderstamp in turn comprising an approximate timestamp that includes a serial identifier, wherein the approximate timestamp comprises an approximate time that the delete originated on an originating computer, and wherein the serial identifier comprises an identifier unique to the originating computer such that each orderstamp is globally unique;
recording for each entry in a computer a history of inserts and deletes and for that entry that have been processed by the computer and corresponding orderstamps;
labeling a query with an orderstamp;
when processing a query on a computer, identifying entries that are in a subset specified by the query, that are covered by the computer, that have in the history for the entry an orderstamp before the orderstamp of the query, and that have in the history for the entry latest orderstamp before the orderstamp of the query corresponding to an insert.

5. A method for addressing inconsistency and ensuring progress in a distributed data store involving one or more computers, comprising the steps of:
labeling an insert with an orderstamp, said orderstamp in turn comprising an approximate timestamp that includes a serial identifier, wherein the approximate timestamp comprises an approximate time that the insert originated on an originating computer, and wherein the serial identifier comprises an identifier unique to the originating computer such that each orderstamp is globally unique;
labeling a delete with an orderstamp, said orderstamp in turn comprising an approximate timestamp that includes a serial identifier, wherein the approximate timestamp comprises an approximate time that the delete originated on an originating computer, and wherein the serial identifier comprises an identifier unique to the originating computer such that each orderstamp is globally unique;
recording for each entry in a computer a history of inserts and deletes and for that entry that have been processed by the computer and corresponding orderstamps;
labeling a query with an orderstamp;
recording for a computer a history of queries processed by the computer and the corresponding orderstamps;
when processing a query on a computer, identifying entries that are in a subset specified by the query, that are covered by the computer, that have in the history for the entry an orderstamp before the orderstamp of the query, and that have in the history for the entry latest orderstamp before the orderstamp of the query corresponding to an insert.

6. The method of claim 5, further comprising the steps of:
when processing an insert or delete, determining whether having processed the insert or delete before any queries in the query history would have affected the query answers; and
if so, indicating which queries would have been affected.

7. A distributed data store comprising:
one or more computers having storage, wherein each of the computers comprises a set of modes of operation, each mode using orderstamps, said orderstamp in turn comprising an approximate timestamp that includes a serial identifier, wherein the approximate timestamp comprises an approximate time that an entry originated on an originating computer, and wherein the serial identifier comprises an identifier unique to the originating computer such that each orderstamp is globally unique;
means for labeling an entry with an orderstamp;
means for recording in the storage for each entry in each of the computers a latest orderstamp and among orderstamps for insert and delete operations for that entry that have been processed by the computer;

means for recording for each entry in each of the computers whether an operation corresponding to the latest orderstamp is an insert or a delete;

means for labeling a query in each of the computers with an orderstamp; and when processing a query on each of the computers, means for identifying entries that are in a subset specified by the query, that are covered by the computer, that have latest orderstamp before the orderstamp of the query, and that have operation type insert corresponding to the latest orderstamp.

8. The data store of claim 7, said modes comprising any of a mode for:
maintaining greatest insert or delete orderstamp for each entry;
maintaining insert and delete history for each entry; and
maintaining insert, delete, and query histories.

9. A method for a computer reclaiming storage in one or more computer-related devices periodically, continuously using a low-priority thread, or when storage is needed, comprising the steps of:
determining if memory time exceeds settling time, in which case there is no inconsistency due to settling;
determining if a computer records a time up to which it has reclaimed storage (cut time), wherein said computer recognizes and reports operations that arrive with orderstamps that have time earlier than said cut time, said orderstamp comprising an approximate timestamp that includes a serial identifier wherein the approximate timestamp comprises an approximate time that the insert originated on an originating computer, and wherein the serial identifier comprises an identifier unique to the originating computer such that each orderstamp is globally unique;
determining if a computer processes a query when said cut time of said computer is after a query ceiling, wherein said computer reports as possible sources of inconsistency due to settling any entries that are in a subset specified by said query and have an earliest orderstamp in an entry history after a query ceiling; and
determining if a computer processes an insert or delete when said cut time of said computer is later than a time of an orderstamp of an insert or delete operation, wherein said computer includes said operation in a history for an entry only if said entry has no history or if said entry history includes an orderstamp before an orderstamp of the insert or delete operation being processed.

10. A distributed data store, comprising:
one or more computers having storage, wherein each of the computers comprises a set of modes of operation, each mode using orderstamps, said orderstamp in turn comprising an approximate timestamp that includes a serial identifier, wherein the approximate timestamp comprises an approximate time that an entry originated on an originating computer, and wherein the serial identifier comprises an identifier unique to the originating computer such that each orderstamp is globally unique, wherein the orderstamp is used to address any of the following concerns:
inconsistency due to duplicate operations;
inconsistency due to order of operations;
inconsistency due to synchronization, query ceilings; and
inconsistency due to settling;
wherein said modes comprise:
means for labeling an insert with an orderstamp;
means for labeling a delete with an orderstamp;
means for recording in the storage for each entry in a computer a latest orderstamp and among orderstamps for insert and delete operations for that entry that have been processed by the computer;
means for recording for each entry in the computer whether an operation corresponding to the latest orderstamp is an insert or a delete;
means for labeling a query with an orderstamp; and
when processing a query on a computer, means for identifying entries that are in a subset specified by the query, that are covered by the computer, that have latest orderstamp before the orderstamp of the query, and that have operation type insert corresponding to the latest orderstamp.

11. A distributed data store, comprising:
one or more computers having storage, wherein each of the computers comprises a set of modes of operation, each mode using orderstamps, said orderstamp in turn comprising an approximate timestamp that includes a serial identifier, wherein the approximate timestamp comprises an approximate time that an entry originated on an originating computer, and wherein the serial identifier comprises an identifier unique to the originating computer such that each orderstamp is globally unique, wherein the orderstamp is used to address any of the following concerns:
inconsistency due to duplicate operations;
inconsistency due to order of operations;
inconsistency due to synchronization, query ceilings; and
inconsistency due to settling;
wherein said modes comprise:
means for labeling an insert with an orderstamp;
means for labeling a delete with an orderstamp;
means for recording in the storage for each entry in a computer a history of inserts and deletes and for that entry that have been processed by the computer and corresponding orderstamps;
means for labeling a query with an orderstamp; and
when processing a query on a computer, means for identifying entries that are in a subset specified by the query, that are covered by the computer, that have in the history for the entry an orderstamp before the orderstamp of the query, and that have in the history for the entry latest orderstamp before the orderstamp of the query corresponding to an insert.

12. A distributed data store, comprising:
one or more computers having storage, wherein each of the computers comprises a set of modes of operation, each mode using orderstamps, said orderstamp in turn comprising an approximate timestamp that includes a serial identifier, wherein the approximate timestamp comprises an approximate time that an entry originated on an originating computer, and wherein the serial identifier comprises an identifier unique to the originating computer such that each orderstamp is globally unique, wherein the orderstamp is used to address any of the following concerns:
inconsistency due to duplicate operations;
inconsistency due to order of operations;
inconsistency due to synchronization, query ceilings; and
inconsistency due to settling;
wherein said modes comprise:
means for labeling an insert with an orderstamp;
means for labeling a delete with an orderstamp;
means for recording in the storage for each entry in a computer a history of inserts and deletes and for that entry that have been processed by the computer and corresponding orderstamps;

means for labeling a query with an orderstamp;

means for recording for a computer a history of queries processed by the computer and the corresponding orderstamps; and when processing a query on a computer, means for identifying entries that are in a subset specified by the query, that are covered by the computer, that have in the history for the entry an orderstamp before the orderstamp of the query, and that have in the history for the entry latest orderstamp before the orderstamp of the query corresponding to an insert.

* * * * *